United States Patent
Xiang et al.

(10) Patent No.: US 8,041,057 B2
(45) Date of Patent: Oct. 18, 2011

(54) MIXING TECHNIQUES FOR MIXING AUDIO

(75) Inventors: Pei Xiang, San Diego, CA (US); Eddie L. T. Choy, Carlsbad, CA (US); Prajakt V. Kulkarni, San Diego, CA (US); Samir Kumar Gupta, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1201 days.

(21) Appl. No.: 11/449,454

(22) Filed: Jun. 7, 2006

(65) Prior Publication Data

US 2007/0286426 A1 Dec. 13, 2007

(51) Int. Cl.
*H04B 1/00* (2006.01)

(52) U.S. Cl. ............ 381/119; 381/104; 381/107; 381/1; 455/569.2

(58) Field of Classification Search .......... 381/119, 381/104, 107, 86, 61, 1, 17–19; 379/420.01–420.03; 700/94; 455/569.1–569.2, 99; 369/1, 4
See application file for complete search history.

(56) References Cited

U.S. PATENT DOCUMENTS

| | | | |
|---|---|---|---|
| 5,243,640 A * | 9/1993 | Hadley et al. | 455/426.1 |
| 5,809,149 A | 9/1998 | Cashion et al. | |
| 5,850,455 A | 12/1998 | Arnold et al. | |
| 6,011,851 A | 1/2000 | Conner et al. | |
| 6,067,361 A | 5/2000 | Kohut et al. | |
| 6,154,545 A | 11/2000 | Kohut et al. | |
| 6,349,223 B1 * | 2/2002 | Chen | 455/569.2 |
| 6,504,934 B1 | 1/2003 | Kasai et al. | |
| 6,611,603 B1 | 8/2003 | Norris et al. | |
| 6,839,438 B1 | 1/2005 | Riegelsberger et al. | |
| 6,850,496 B1 | 2/2005 | Knappe et al. | |
| 6,882,971 B2 | 4/2005 | Craner | |
| 6,947,728 B2 | 9/2005 | Tagawa et al. | |
| 6,959,071 B2 | 10/2005 | Fujisawa | |
| 6,983,251 B1 | 1/2006 | Umemoto et al. | |
| 6,985,594 B1 | 1/2006 | Vaudrey et al. | |
| 7,012,630 B2 | 3/2006 | Curry et al. | |
| 7,206,413 B2 * | 4/2007 | Eid et al. | 381/22 |
| 7,433,716 B2 | 10/2008 | Denton | |

(Continued)

FOREIGN PATENT DOCUMENTS

| | | |
|---|---|---|
| EP | 0666702 A2 | 8/1995 |
| EP | 1657961 A1 | 5/2006 |

OTHER PUBLICATIONS

International Search Report—PCT/US07/069232—International Search Authority—European Patent Office, Feb. 25, 2008.

(Continued)

*Primary Examiner* — Vivian Chin
*Assistant Examiner* — Jason R Kurr
(74) *Attorney, Agent, or Firm* — Timothy F. Loomis; Espartaco Diaz Hidalgo

(57) ABSTRACT

This disclosure describes audio mixing techniques that intelligently combine two or more audio signals into an output signal. The techniques allow audio to be combined, yet create perceptual differentiation between the different audio signals. The result is that a user is able to hear both audio signals in a combined output, but the different audio signals do not perceptually interfere with one another. The techniques are relatively simple to implement and are well suited for radio telephones.

45 Claims, 6 Drawing Sheets

U.S. PATENT DOCUMENTS

| | | | |
|---|---|---|---|
| 7,489,951 B2 | 2/2009 | Kanamori et al. | |
| 7,697,947 B2* | 4/2010 | Wakefield | 455/502 |
| 2002/0045438 A1 | 4/2002 | Tagawa | |
| 2002/0186822 A1 | 12/2002 | Fujisawa | |
| 2004/0078104 A1* | 4/2004 | Nguyen et al. | 700/94 |
| 2004/0106432 A1 | 6/2004 | Kanamori | |
| 2007/0078543 A1 | 4/2007 | Wakefield | |
| 2008/0170703 A1 | 7/2008 | Zivney | |

OTHER PUBLICATIONS

International Search Report, PCT/2007/069232—International Search Authority—European Patent Office, Feb. 25, 2008.

International Preliminary Report on Patentability. PCT/2007-069232—The International Bureau of WIPO—Geneva; Switzerland, Dec. 10, 2008.

Written Opinion, PCT/2007/069232—International Search Authority—European Patent Office, Feb. 25, 2008.

Chowning, J. M.: "The Simulation of Moving Sound Sources," Journal of the Audio Engineering Soecity, Audio Engineering Society, New York, NY, vol. 19, No. 1, pp. 2-06 (Jan. 1, 1971) XP000795995, ISSN: 1549-4950.

* cited by examiner

MIXING TECHNIQUES FOR MIXING AUDIO

TECHNICAL FIELD

This disclosure relates to audio processing and, more particularly, audio mixing techniques that combine two or more audio signals to create an output signal.

BACKGROUND

The terms "audio" and "audio signal" are used herein to refer to any of a wide variety of audio signals or sources such as music, speech, tones, alerts, and the like. Audio signals refer to analog or digital signals. For digital audio, data compression may be used via audio coding. There are many audio coding standards that facilitate the coding of digital audio. Examples include standards defined by the motion pictures expert group (MPEG), windows media audio (WMA) standards, and standards by Dolby Laboratories, Inc. Moreover, many audio coding standards continue to emerge, including the digital MP3 standard and successors to the MP3 standard, such as the advanced audio coding (AAC) standard used in "iPod" devices sold by Apple Computer, Inc.

Many different types of devices can deliver audio to users. Examples of such audio devices include music players, wireless mobile devices, wireless communication devices, such as radio telephones, direct two-way communication devices (sometimes called walkie-talkies), desktop and laptop computers, workstations, satellite radio devices, intercom devices, radio broadcasting devices, on-board computers used in automobiles, watercraft and aircraft, and a wide variety of other devices.

In many situations, two or more audio signals (which may be analog or digital signals) are processed simultaneously by a given audio device. In the case of radio telephones that also provide digital music capabilities, for example, the music output may conflict with the audio associated with an incoming telephone call. To address this conflict, conventionally, an incoming telephone call preempts any music output. In this case, the music may be muted when an incoming telephone call is received.

SUMMARY

In general, this disclosure describes audio mixing techniques that intelligently combine two or more audio signals (which may be analog or digital) into a combined output signal. The techniques can allow the audio signals to be combined, yet create perceptual differentiation between the different audio signals that form the combined output. The perceptual result is that a user can hear audio associated with both audio signals, but the different audio signals do not perceptually interfere with one another. The disclosed techniques are particularly efficient and easy to implement, even in small handheld devices such as radio telephones. Several optional enhancements to the techniques are also described, which can further enhance sound quality of the mixed output.

In one embodiment, this disclosure provides a method comprising receiving a first audio and a second audio, applying a first positive gain to a first channel of the first audio, applying a negative gain to a second channel of the first audio, applying a second positive gain to a first channel of the second audio, applying a third positive gain to a second channel of the second audio, combining the first channel of the first audio with the first channel of the second audio, and combining the second channel of the first audio with the second channel of the second audio.

In another embodiment, this disclosure provides a method comprising receiving a music audio and a phone call audio, the music audio including first and second channels and the phone call audio including a mono channel, applying scalar functions to the music audio to change a path of the music audio from a foreground path to a background path, applying low pass filters to the first and second channels of the music audio in the background path, delaying the second channel of the music audio in the background path, applying a first positive gain to the first channel of the music audio in the background path, applying a first negative gain to a first path of the second channel of the music audio in the background path, applying a second negative gain to a second path of the second channel of the music audio in the background path, and adding the second path of the second channel of the music audio into the first channel of the music audio in the background path. The method also includes defining first and second channels for the phone call audio based on mono channel, applying a second positive gain to a first channel of the phone call audio, applying a third positive gain to a second channel of the phone call audio, combining the first channel of the music audio in the background path with the first channel of the phone call audio, and combining the second channel of the music audio in the background path with the second channel of the phone call audio.

The techniques of this disclosure may be implemented using hardware, software, firmware, or any combination thereof. If implemented in software, the techniques of disclosure may be embodied on a computer readable medium comprising instructions that upon execution, perform one or more of the methods described herein. If implemented in hardware, the techniques may be embodied in one or more processors, application specific integrated circuits (ASICs), field programmable gate arrays (FPGAs), and/or discrete logic circuitry.

In another embodiment, this disclosure provides a device comprising an audio mixing unit that combines two or more audio signals to form an audio output. In this case, the audio mixing unit receives a first audio signal and a second audio signal, applies a first positive gain to a first channel of the first audio signal, applies a negative gain to a second channel of the first audio signal, applies a second positive gain to a first channel of the second audio signal applies a third positive gain to a second channel of the second audio signal, combines the first channel of the first audio signal with the first channel of the second audio signal, and combines the second channel of the first audio signal with the second channel of the second audio signal.

In another embodiment, this disclosure provides a device comprising means for receiving a music audio signal and a phone call audio signal, the music audio signal including first and second channels and the phone call audio signal including a mono channel, means for applying scalar functions to the music audio signal to change a path of the music audio signal from a foreground path to a background path, means for applying low pass filters to the first and second channels of the music audio signal in the background path, means for delaying the second channel of the music audio signal in the background path, means for applying a first positive gain to the first channel of the music audio signal in the background path, means for applying a first negative gain to a first path of the second channel of the music audio signal in the background path, means for applying a second negative gain to a second path of the second channel of the music audio signal in the background path, and means for adding the second path of the second channel of the music audio signal into the first channel of the music audio signal in the background path. The device also includes means for defining first and second channels for the phone call audio signal based on mono channel, means for applying a second positive gain to a first channel of the phone call audio signal, means for applying a third positive gain to a second channel of the phone call audio signal, means for combining the first channel of the music audio signal in the background path with the first channel of the phone call audio signal, and means for combining the second channel of the music audio signal in the background path with the second channel of the phone call audio signal.

In another embodiment, this disclosure provides a device comprising an audio mixing unit. The mixing unit receives first audio information including first and second stereo channels, generates first foreground audio output based on the first audio information, receives second audio information, applies gains to the first and second stereo channels to generate background audio output, generates second foreground audio output based on the second audio information, and combines the second foreground audio output with the background audio output to generate combined output for the first and second audio information.

In another embodiment, this disclosure provides a device comprising an audio mixing unit that receives music audio, presents the music audio to a user, receives telephone call audio, mixes the music audio and the telephone call audio so that the music audio is background audio and the telephone call audio is foreground audio, including applying gains to the music audio to create a background perception, and presents a combination of the music audio with the telephone audio as a combined output with the music in the background and the telephone call in the foreground.

Additional details of various embodiments are set forth in the accompanying drawings and the description below. Other features, objects and advantages will become apparent from the description and drawings, and from the claims.

DETAILED DESCRIPTION

This disclosure describes audio mixing techniques that intelligently combine two or more audio signals into an output signal. The terms "audio" and "audio signal" are used herein to refer to any of a wide variety of audio signals or sources such as music, speech, tones, alerts, and the like. Moreover, the term audio signals, as used herein, refers to analog or digital versions of audio information. The techniques of this disclosure allow audio signals to be combined, yet create perceptual differentiation between the different audio signals. The result is that a user is able to hear both audio signals in a combined output, but the different audio signals that make up the combined output do not perceptually interfere with one another. In particular, processing is performed on one of the audio signals to change the respective audio signal to a perceptual background. The processing is relatively simple, particularly when compared to conventional arts that create equivalent perceptual changes by positioning audio signals into different 3D spatial locations with HRTF (head related transfer function) filters.

In one example, which is described in detail below, a radio telephone can operate in music mode or phone mode. In music mode, the left and right channels of the music are delivered to a user in the foreground. Upon receiving an inbound telephone call, however, the radio telephone transitions to a phone mode. In phone mode, the music audio and the phone call audio are combined. The music audio, however, is processed into a perceptual background. The techniques of this disclosure use scaling, filtering, delays, and/or channel combination within a background processing path in order to generate pleasing musical output in which the music is perceived as background audio, while the phone call audio is perceived as foreground audio. The example of music mode and phone mode, however, is only exemplary, and the techniques of this disclosure work well in combining a wide variety of other types of audio signals for radio telephones or many other types of audio devices.

Figure 1:
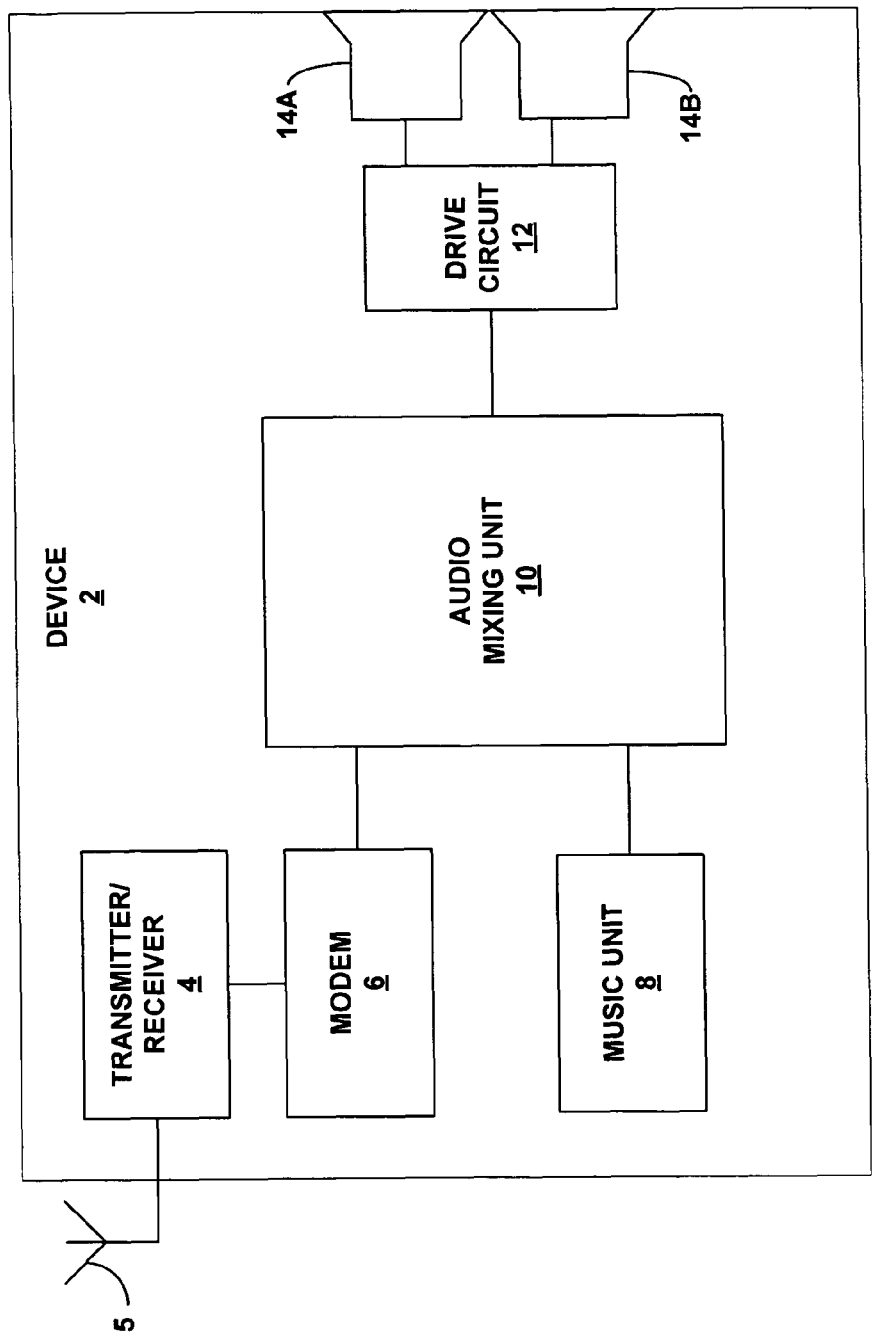
FIG. 1 is a block diagram of an exemplary audio device that can implement the techniques of this disclosure.

FIG. 1 is a block diagram of an exemplary audio device 2 that can implement the techniques of this disclosure. The illustrated components of device 2 are only those needed to fully describe the techniques of this disclosure. Device 2 may include many other components, such as a processor, a display, user input devices, or wide variety of other components. The other components of device 2 would typically depend on the type of device being designed. Indeed, even some of the illustrated components are optional and not necessarily needed in order for a device to implement the techniques of this disclosure. In general, mixing unit 10 is the component of device 2 that executes the techniques described herein.

Exemplary audio device 2 may comprise a wireless radio telephone, such as a so-called cell phone. To this end, device 2 may include a transmitter/receiver 4 and a modulator/demodulator "MODEM" 6. Transmitter/receiver 4 sends and receives wireless signals via antenna 5. MODEM 6 demodulates received wireless signals, and generates an audio signal, i.e., phone call audio associated with an incoming telephone call.

Device 2 also has the capability of playing music to a user. To play the music, device 2 includes a music unit 8. Music unit 8 may comprise an audio decoder that decodes digitally encoded music, e.g., decodes MP3 files, AAC files, or the like. Music unit 8 is not necessarily digital, however, and may process analog audio signals in some embodiments. In addition, in some embodiments, device 2 may be equipped to play video or support video telephony (VT) with a remote device. Accordingly, device 2 also may include a camera, and form a so-called camera phone or video phone that supports VT applications.

In accordance with this disclosure, and with reference to FIG. 1, device 2 includes an audio mixing unit 10. As noted above, mixing unit 10 generally embodies the techniques of this disclosure. In particular, mixing unit 10 facilitates the intelligent mixing of two or more audio signals. Again, while the techniques of this disclosure are being described in the context of mixing a music audio signal with a phone call audio signal, this disclosure more generally contemplates the combination of any first and second audio signals. The first and second audio signals being mixed may comprise any type of audio, as long as the audio signals are associated with different sources, and need to be combined to create perceptual differences in the sources of the audio signal. For example, the first and second audio signals could be a music audio signal and a phone call audio signal, two different phone call audio singles, two different music audio signals, or any combination of phone call, music, speech and/or tone audio signals. Any other type of non-music audio could also be processed from foreground to background, as described herein.

Initially, device 2 may operate in a music mode. In music mode, mixing unit 10 receives an audio signal from music unit 8. Music unit 8 may comprise an audio coder/decoder (CODEC) and associated volatile or non-volatile memory. Music unit 8 may decode digital audio signals to generate a music audio signal. Alternatively, music unit 8 may play analog audio signals to generate the music audio signal. The generated music audio is delivered to audio mixing unit 10 which forwards output signals to drive circuit 12 to drive speakers 14A and 14B.

When an incoming telephone call is received, device 2 changes from music mode to phone call mode. In accordance with this disclosure, the phone call mode allows the music to be played in the background, while phone call audio is in the foreground. This allows a user to enjoy the music without interruption when an incoming telephone call is received. Furthermore, according to this disclosure, the music can be changed in the phone call mode such that the music audio signal is processed to become background music. For purposes of this disclosure, it is assumed that phone call mode is a mode in which an incoming phone call and music are combined. Of course, device 2 may also operate in a phone only mode that does not include any music in the background.

In phone call mode (with music), mixing unit 10 receives a first audio signal (i.e., a music signal from music unit 8) and a second audio signal (i.e., a phone call audio signal from MODEM 6). Mixing unit 10 processes the music audio and phone call audio to combine these audio signals, and in doing so, moves the music audio to a perceptual background. To do this, mixing unit 10 may apply a first positive gain to a first channel of the first audio signal (the music), apply a first negative gain to a second channel of the first audio signal, apply a second positive gain to a first channel of the second audio signal (the phone call), and apply a third positive gain to a second channel of the second audio signal. Mixing unit 10 then combines the first channel of the first audio signal with the first channel of the second audio signal, and combines the second channel of the first audio signal with the second channel of the second audio signal. In addition to the gains, which can be defined to help create a background effect for the music in phone mode, several other processing techniques may also be employed by mixing unit 10. In particular, mixing unit 10 may perform scaling, filtering, delays, and/or channel combination in order to achieve the desired effect with efficient implementation.

Once the first and second audio signals (e.g., the music and the phone call) have been combined, mixing unit 10 delivers an output signal to drive circuit 12. Drive circuit 12 uses the output signal to generate drive signals that can drive speakers 14A and 14B and thereby generate audible sounds. Speakers 14 may comprise headphone speakers, floor standing speakers, speakers in a motorized vehicle, or generally, any type of speaker design.

Figure 2:
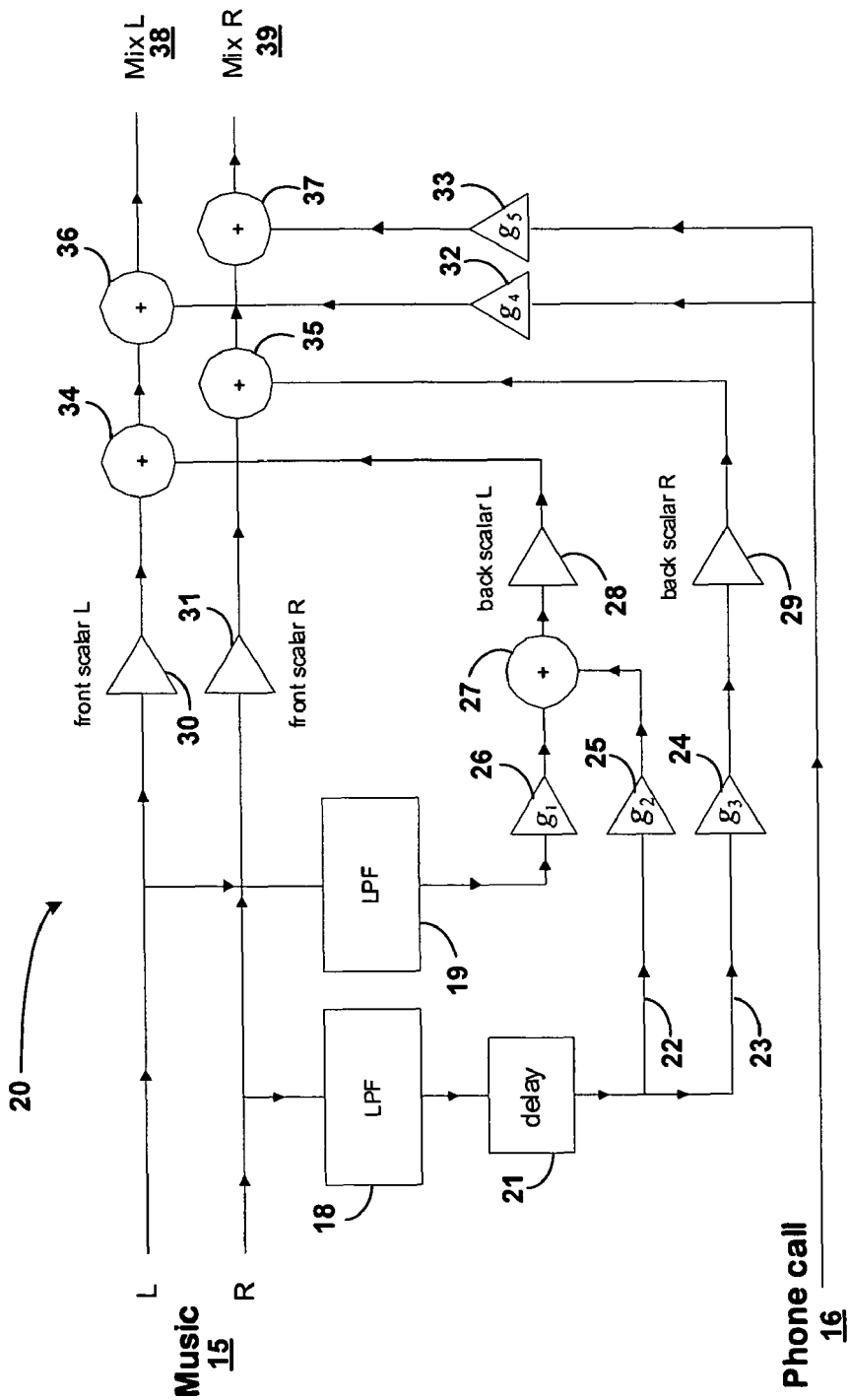
FIG. 2 is a block diagram of an exemplary audio mixing unit that may be used in an audio device to execute the techniques of this disclosure.

FIG. 2 is a block diagram of an exemplary audio mixing unit 20 that may be used in an audio device to execute the techniques of this disclosure. Mixing unit 20 of FIG. 2 may correspond to mixing unit 10 of FIG. 1, or may be used in other types of devices. As shown in FIG. 2, mixing unit 20 receives two audio signals, music 15 and phone call 16.

In the example of FIG. 2, one audio signal is stereophonic music 15, and the other audio signal is monophonic phone call 16, although this disclosure is not limited in this respect. Mixing unit 20 operates in a music mode when no phone call is in session. In this music mode, music occupies the whole foreground. If a phone call comes in, however, mixing unit 20 enters phone call mode, which causes the music to retreat to the background while the phone call remains in the foreground. In FIG. 2, the music path through scalars 30 and 31 is referred to as the foreground path, while the music path through scalars 28 and 29 is the background path.

The mono phone call audio signal 16 is directly mixed into the stereo output, and scaled by gain values $g_4$ and $g_5$ for the left and right mix, respectively. In this way, a phone call will be heard as clear speech in the foreground sound stage, possibly skewed toward one side, depending on the gain values.

The music has a foreground copy scaled by a first (left) front scalar 30 and a second (right) front scalar 31, and a background copy scaled by a first (left) back scalar 28 and second (right) back scalar 29. During steady states of the two modes, the scalar values are shown in Table 1, discussed below.

To create a background sound image, one of the left (L) or right (R) audio channels is multiplied with negative scalar values (e.g., $g_2$ and $g_3$), so that the stereo sound image of the background sound is more diffusive than a foreground sound image. In the example, of FIG. 2, the R stereo channel is divided into components or paths 22, 23, and each of the paths of the R channel is multiplied with respective negative scalar value $g_2$ and $g_3$. One of the stereo audio channels (the R channel in this example) is also added back into the other channel. The different paths 22, 23 allow one path to be added back to the other channel with a different gain than the path that defines that respective channel. This design helps to skew the background sound image so that it is not at the center of the sound stage, which psychologically creates a sense of less importance. The background sound is also lower in level than the foreground copy. If the music is mono, then a stereo signal of identical L and R channels is generated and used, and the perceptual result is similar to that of a stereo input.

In order to strengthen the sensation of a background sound, two low-pass filters (LPFs) 18 and 19 can be used to filter out high frequencies from the L and R components of the music audio prior to application to the corresponding gains g1, g2 and g3. Application of LPFs 18 and 19 mimics and exaggerates the air absorption effect that causes distant sound objects to exhibit less spectral power in high frequency than closer ones. The use of low-pass filters in the system of FIG. 2 is optional.

A delay circuit 21 can also be used after one of the low-pass filters. The delay introduced by delay circuit 21 into one of the channels helps further diffuse the background sound image so that it sounds less clear and more like a background sound. This delay circuit 21 is also optional. Approximately 10 milliseconds of delay is typically sufficient to enhance the background effect without causing undesirable artifacts in the audio.

Figures 3A, 3B:
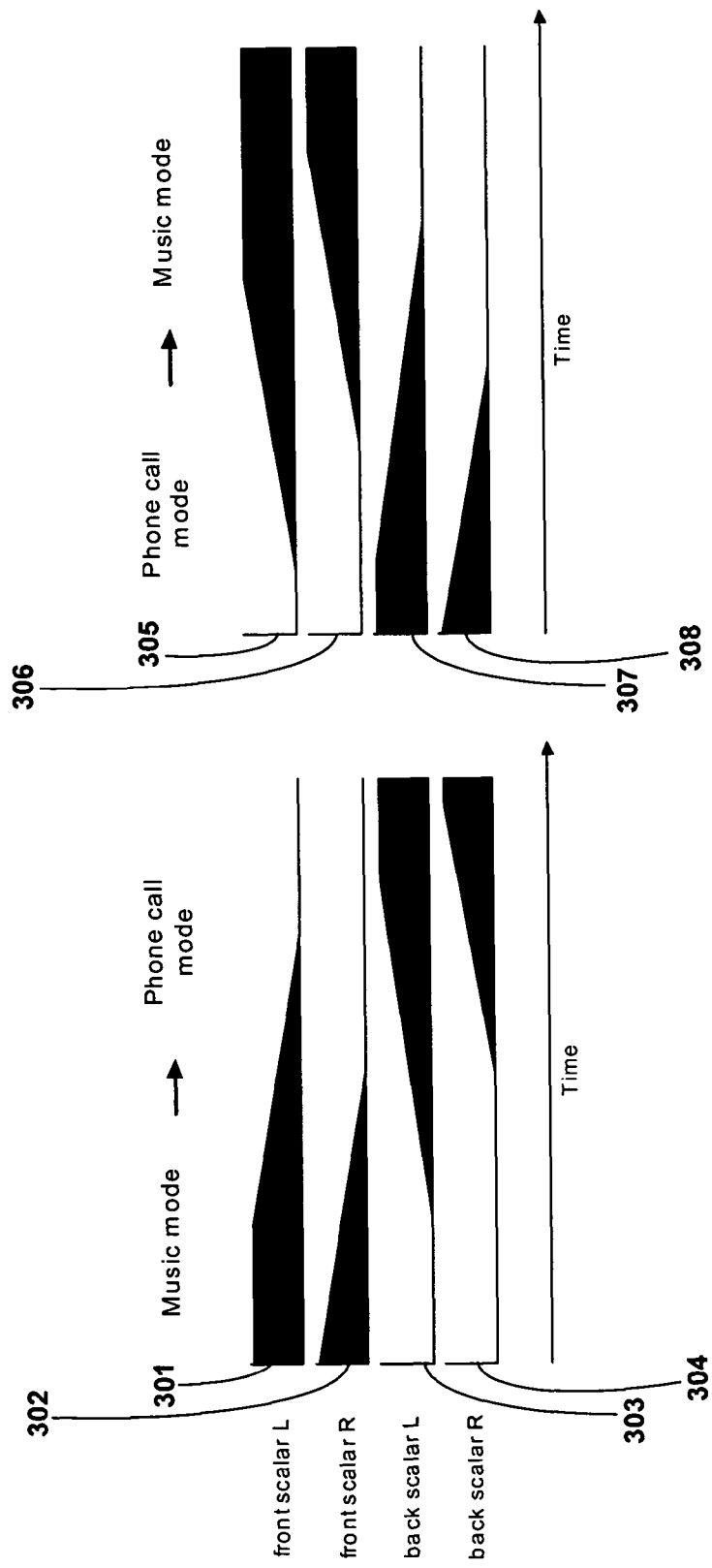
FIG. 3A is a timing diagram illustrating exemplary scalar functions for changing the channels of an audio signal from a foreground path to a background path.
FIG. 3B is a timing diagram illustrating exemplary scalar functions for changing the channels of an audio signal from a background path to a foreground path.

Toggling between music mode and phone call mode is realized by changing the stereophonic music processing between its foreground path and background path. To smooth the transition, linear scalar changes can be made on the scalars listed in Table 1, below, as illustrated in FIGS. 3A and 3B. Specifically, FIGS. 3A and 3B illustrate how the scalar values may change in time while switching between music mode and phone call mode. Linear transitions can reduce computational complexity, although other transition curves could also be used. The scalar values graphed in FIGS. 3A and 3B all fall between zero and unity.

Referring again to FIG. 2, music 15 is initially played as the only audio. In the music only mode, front scalars 30 and 31 for the left and right channels are set to unity, i.e., a level of 1, to allow the music to be played in the foreground. At this point, back scalars 28 and 29 are set to zero to block music from the background path. If the music is mono, left and right channels may be generated or simply duplicated from the mono music signal. In this music only mode, the mixed output 38 and 39 for the left and right channels includes the music in the foreground, and nothing in the background. The music path through scalars 30 and 31 is referred to herein as the foreground path. The background path, in contrast, passes through scalars 28 and 29.

When a phone call audio signal 16 is received, mixing unit 20 changes to a phone call mode. Phone call audio signal 16 may include the ringtone alert that is delivered to the user, followed by a telephone conversation, assuming that the user answers the phone call in response to hearing the ringtone alert. Phone call audio signal 16 is monophonic, in which case the same signal is split and delivered down two different paths through amplifiers 32 and 33 to define output in the left and right channels. Of course, the left and right channels described herein could be reversed with similar results. Also, the same techniques could be used with a phone call audio signal that is stereophonic.

In accordance with this disclosure, to process phone call audio signal 16, mixing unit 20 changes to phone call mode, and music audio signal 15 is transitioned from a foreground signal to a background signal. In this case, the scalar values of front scalars 30 and 31 are transitioned from unity (1) to zero (0) to block any music in the front (foreground) path. At the same time, scalar values of back scalars 28 and 29 are transitioned from zero (0) to unity (1) to allow music through the background path. Scalars 28, 29, 30 and 31 may comprise adjustable gain circuits or software-implemented amplifiers that define transfer functions illustrated in FIGS. 3A and 3B, depending on the mode changes. In particular, FIGS. 3A and 3B, which are discussed in greater detail below, provide some effective transfer functions for these transitions executed by scalars 30, 31, 28 and 29 respectively. The transition may take only a few seconds, e.g., approximately three seconds, and therefore typically occurs during the ringtone portion of the phone call audio.

In the background path, the left and right channels of music signal 15 are filtered by low pass filters 19 and 18 respectively. By way of example, low pass filters 19 and 18 may comprise single-pole filters with a transfer function in z-domain of approximately:

$$H(z) = \frac{0.15}{1 - (0.8)z^{-1}}$$

where parameters are designed with a 44100 Hz sampling rate.

Following first low pass filter 18 for the right channel of music audio signal 15, a delay circuit 21 may be added, as mentioned above. By way of example, delay circuit 21 may add a delay of approximately 10 milliseconds. The delay adds a diffusion effect to the music, which enhances the background effect.

Following delay circuit 21, the right channel of music audio signal 15 is separated into two paths 22 and 23. Scaling is performed on the paths 22 and 23 by amplifiers 24 and 25. Path 22 is then passed through back scalar 29, which at this point, has either a value of unity (1) or is transitioning to unity. The output of back scalar 29 defines the right channel of music signal 15 in the background path. This output of back scalar 29 is combined with any fading foreground music via adder 35. In particular, if front scalar 31 has not yet transitioned to zero, some foreground music may still be present in the right channel, which is combined with the background path via adder 35.

Following second low pass filter 19 for the left channel of music audio signal 15, scaling is performed by amplifier 26. The scaled version of the right channel in path 22 is then added to the left channel via adder 27. This adds a leftward skew to the music signal in the background path, which further enhances the background effect. The left channel of music audio signal 15 is then passed through back scalar 28, which at this point either has a value of unity (1) or is transitioning to unity. The output of back scalar 28 defines the left channel of music signal 15 in the background path. This output of back scalar 28 is combined with any foreground music via adder 34. Like the right channel, for the left channel, if front scalar 30 has not yet transitioned to zero, some foreground music may still be present, and will be combined with the background path via adder 34.

The gains of amplifiers 24, 25, 26, 32 and 33 may be programmable, and my be selected to obtain a desirable effect of the phone call audio in the foreground and the music in the background. To do this, one or more of amplifiers 24, 25 or 26 in the background path for the music may define negative gain. Specifically, amplifiers 24 and 25 for paths 22 and 23 of the right channel of music signal 15 may define negative gains, which are typically different from one another. As examples, the gains of amplifiers 24, 25, 26, 32 and 33 may be as follows:

amplifier 26 ($g_1$=0.5)
amplifier 25 ($g_2$=-0.07)
amplifier 24 ($g_3$=-0.12)
amplifier 32 ($g_4$=0.575)
amplifier 33 ($g_5$=0.818)

Adders 36 and 37 combine the phone call audio signal 16 with the music audio signal 15. At this point, however, the phone call audio signal 16 is scaled by amplifiers 32 and 33, while the music audio signal 15 is adjusted to the background via filtering, delay, channel combination and scaling. Therefore, the output of mixing unit 20 (mix L signal 38 and mix R signal 39) includes the phone call audio in the foreground and the music in the background. Moreover, the audio effect can include a transition when the music transitions from the foreground to the background or from the background to the foreground. These transitions are executed by scalars 30, 31, 28 and 29.

Table 1, below, sets fourth the values of front scalar L 30, front scalar R 31, back scalar L 28 and back scalar R 29 for music mode and phone call mode.

TABLE 1

|  | Music mode | Phone call mode |
| --- | --- | --- |
| front scalar L | unity | zero |
| front scalar R | unity | zero |
| back scalar L | zero | unity |
| back scalar R | zero | unity |

Moreover, as mentioned above, scalars 30, 31, 28 and 29 can execute transitions from the music mode. The transitions may follow linear or other adjustments from unity to zero or from zero to unity. Furthermore, the transitions may be different for the different channels to create a pleasing audio transition of the music from background to foreground or from foreground to background.

FIGS. 3A and 3B are timing diagrams illustrating exemplary scalar functions for changing the channels of an audio signal from foreground to background (FIG. 3A) and for changing the channels of an audio signal from background to foreground (FIG. 3B). As can be seen from FIG. 3A, the different scalars change the foreground path from unity to zero in a linear manner, and change the background path from zero to unity in a linear manner. However, the different channels do not change simultaneously. That is, the different channels change in a linear manner over different time periods. This can provide an audibly pleasing change from music in the foreground to phone call audio and music with the music moving to the perceptual background. The value of unity (1) means that all of the audio of that given channel is allowed to pass, whereas the value of zero (0) means that all of the audio of that given channel is blocked. As the scalar value passes over a value of 0.5, e.g., channel output of half the amplitude for that path would be included in the output signal.

The time period illustrated in FIGS. 3A and 3B may be between approximately 1 and 6 seconds, e.g., 3.3 seconds. FIG. 3A illustrates a change from music mode to phone call mode. In this case, the front scalar function 301 for the first channel of the first audio changes foreground output for the first channel of the first audio from unity to zero. The front scalar function 302 for the second channel of the first audio changes foreground output for the second channel of the first audio from unity to zero over a different time period than the front scalar function for the first channel of the first audio. The back scalar function 303 for the first channel of the first audio changes background output for the first channel of the first audio from zero to unity. The back scalar function 304 for the second channel of the first audio changes background output for the second channel of the first audio from zero to unity over a different time period than the back scalar function for the first channel of the first audio. Scalar functions 301-304 may be implemented in hardware, software, circuitry, logic, or the like. Moreover, although scalar functions 301-304 are illustrated as being linear in nature, this disclosure is not limited in this respect. Other adjustment function curves, such as cosine and exponential curve, could also be used. Moreover, the different functions applied to the different channels do not necessarily change over different time periods. Rather in some embodiments, the functions can apply over the same time periods to change the respective channels simultaneously from foreground to background or background to foreground.

FIG. 3B illustrates a change from phone call mode back to music mode. In this case, the front scalar function 305 for the first channel of the first audio changes foreground output for the first channel of the first audio from zero to unity. The front scalar function 306 for the second channel of the first audio changes foreground output for the second channel of the first audio from zero to unity over a different time period than the front scalar function for the first channel of the first audio. The back scalar function 307 for the first channel of the first audio changes background output for the first channel of the first audio from unity to zero. The back scalar function 308 for the second channel of the first audio changes background output for the second channel of the first audio from unity to zero over a different time period than the back scalar function for the first channel of the first audio. As with scalar functions 301-304, scalar functions 305-308 could also be linear or following other curves.

Figure 4:
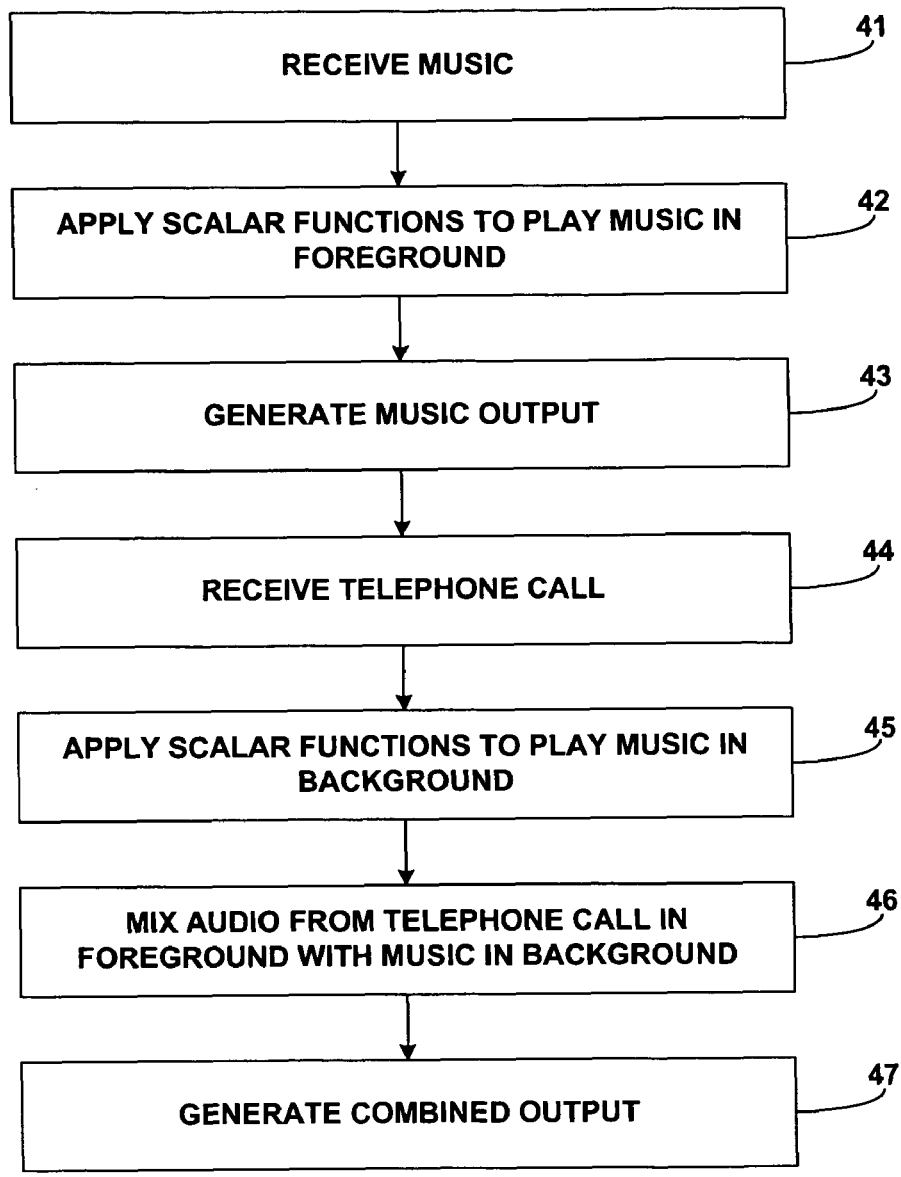
FIGS. 4-6 are flow diagrams illustrating audio mixing techniques of this disclosure.

FIG. 4 is a flow diagram illustrating an audio mixing technique according to this disclosure. As shown in FIG. 4, mixing unit 20 receives a music audio signal 15 (41). Scalars 30, 31, 28 and 29 apply scalar functions to play the music in the foreground (42). In this case, scalars 30 and 31 apply values of unity to allow music to pass along those paths, while scalars 28 and 29 apply values of zero to block music along those paths. Music output is generated based on the music in the foreground (43).

When mixing unit 20 receives audio associated with an incoming telephone call (44), the scalar values of scalars 30, 31, 28 and 29 are changed to play the music in the background (45). The changes may include a short transition period, such as by applying scalar functions like those illustrated in FIG. 3A. At this point, the music changes from foreground to background. Units 18, 19, 21, 24, 25, 26 and 27 all serve to create a background effect in the music, via filtering (units 18 and 19), delay (unit 21), scaling (units 24, 25 and 26) and channel combination (unit 27). Furthermore, the gains of units 24 and 25 may be negative while the gain of unit 26 is positive. These various signal adjustments can be tuned to create a desirable background music effect.

The telephone audio signal 16 is then mixed with music audio signal 15 (following the background processing of music audio signal 15) via adders 36 and 37 (46). Scaling may also be performed on telephone audio signal 16 via amplifiers 32 and 33 following a splitting of the mono telephone signal into two channels having the same audio. Combined output can then be generated (47). In this case, the generated output 38 and 39 for the left and right channels includes the telephone call audio in the foreground and the music in the background. The techniques of this disclosure, however, could also be applied with respect to other types of audio signals.

Figure 5:
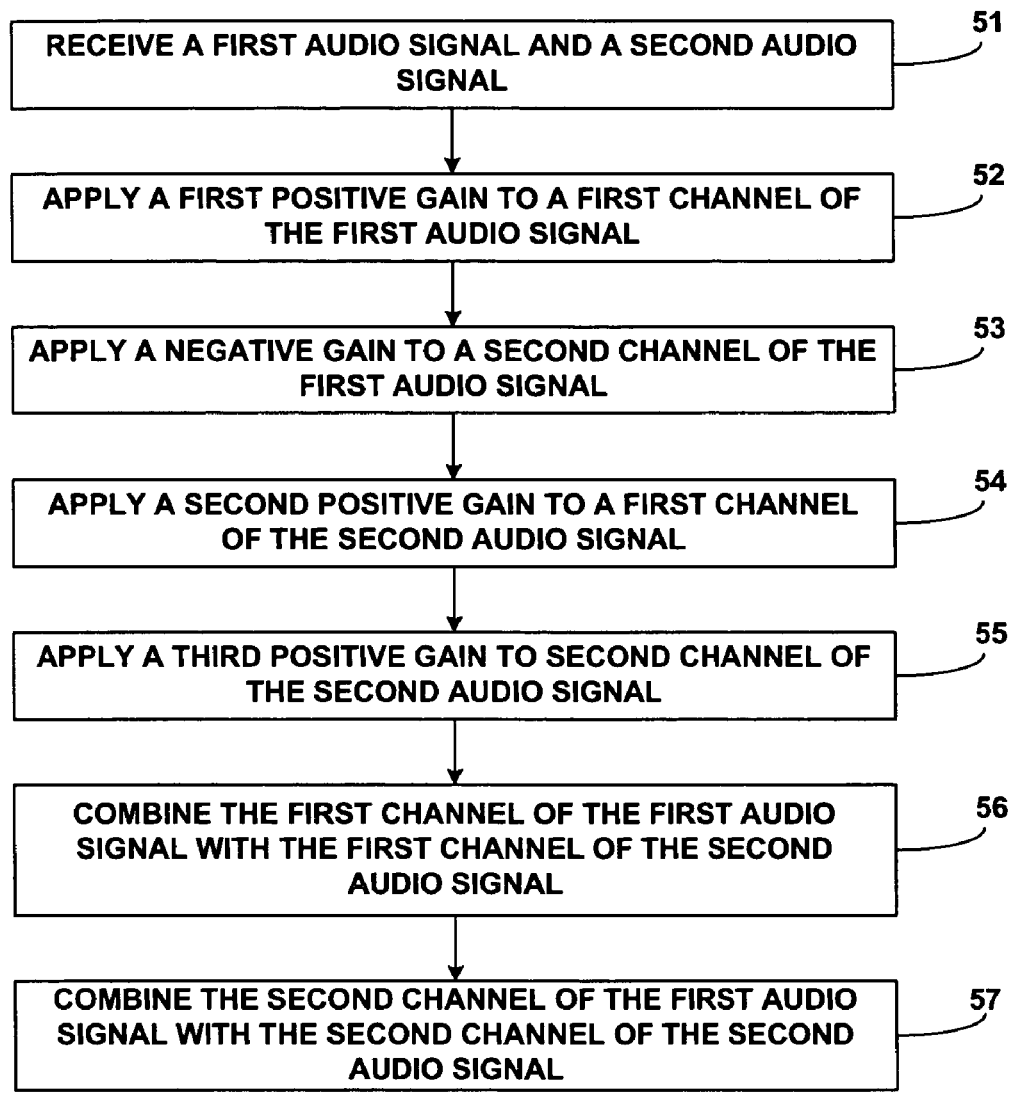

FIG. 5 is another flow diagram illustrating an audio mixing technique according to this disclosure. The technique of FIG. 5 applies when mixing unit 20 is in the phone call mode, in which case, back scalars 28 and 29 are set to unity and front scalars 30 and 31 are set to zero. As shown in FIG. 5, mixing unit 20 receives a first audio signal 15 and a second audio signal 16. Amplifier 26 applies a first positive gain to a first channel of the first audio signal (52), and amplifier 24 applies a first negative gain to a second channel of the first audio signal (53). For the second audio signal 16, amplifier 32 applies a second positive gain to a first channel (54), and amplifier 33 applies a third positive gain to a second channel (55). The first and second channels of audio signal 16 may be identical if the received audio is monophonic.

Adder 36 combines the first channel of the first audio signal with the first channel of the second audio signal (56). In addition, adder 37 combines the second channel of the first audio signal with the second channel of the second audio signal (57). As can be appreciated from FIG. 5, the additional techniques performed by elements 18, 19, 21, 25, and 27 are optional. In other words, the technique of FIG. 5 could be implemented by a circuit similar to that of mixer 20 shown in FIG. 2 even without optional elements 18, 19, 21, 25, and 27. The use of the additional elements 18, 19, 21, 25, and 27, however, can enhance the background effects applied to the music.

Figure 6:
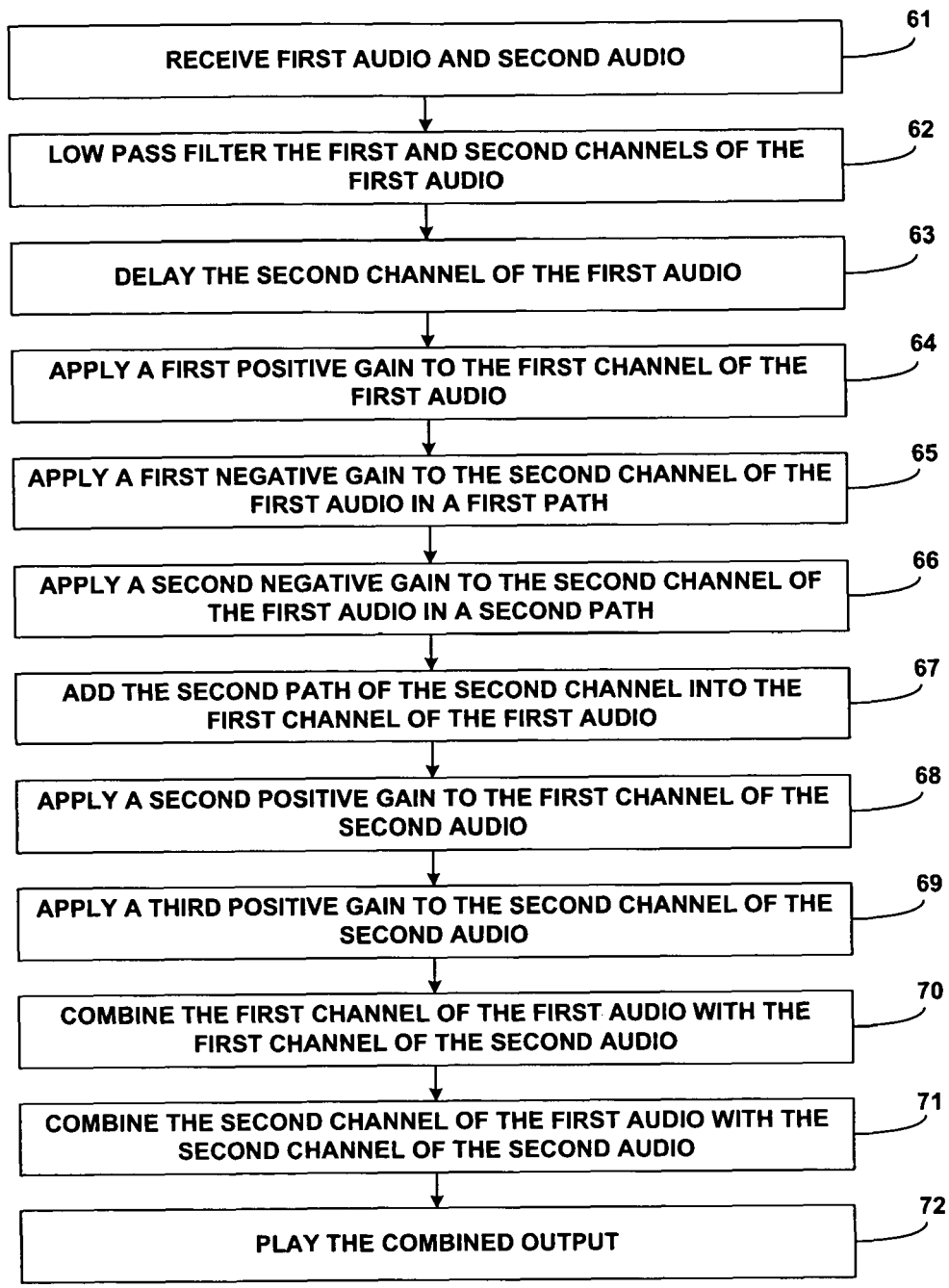

FIG. 6 is another flow diagram illustrating an audio mixing technique according to this disclosure. Like the technique of FIG. 5, the technique of FIG. 6 also applies when mixing unit 20 is in the phone call mode, in which case, back scalars 28 and 29 are set to unity and front scalars 30 and 31 are set to zero. As shown in FIG. 6, mixing unit 20 receives a first audio (music audio 15) and a second audio (phone call audio 16)

(61). In a background path of the first audio, low pass filters 18 and 19 are used to filter the first and second channels (62). This low pass filtering removes high frequency signals to mimic and exaggerate an air absorption effect. Distant sound objects have less spectral power in high frequency than closer ones, so such low-pass filtering can make sound seem more distant.

A delay circuit 21 is then used to delay the second channel of the first audio (63). The addition of delay to one of the channels can diffuse the background sound image so that it sounds less clear, and therefore, more like background sound.

Amplifier 26 applies a first positive gain to the first channel (i.e., the left channel) of the first audio (64). Amplifier 24 applies a first negative gain to the second channel (i.e., the right channel) of the first audio (65). Also, amplifier 25 applies a second negative gain to a second path 22 of the second channel (66). This second path 22 is then added into the first channel of the first audio via adder 27 (67), which skews the background sound image to create more background effect.

The second audio (phone call audio 16) is separated into left and right channels, if such stereophonic channels are not already present. A second positive gain is applied to a first channel (i.e., the left channel) of the second audio via amplifier 32 (68), while a third positive gain is applied to a second channel (i.e., the right channel) of the second audio signal via amplifier 33 (69). The gains of amplifier 32 and 33 may be the same, or may be slightly different to add slight offset the foreground sound image. This can move the foreground sound image away from the background sound image.

Adder 36 combines the first channel of the first audio signal with the first channel of the second audio signal (70). Similarly, adder 37 combines the second channel of the first audio signal with the second channel of the second audio signal (71). Mixed signals 38 and 39 can then be delivered to a drive circuit, which can create drive signals for speakers to play the combined output (72).

The processing techniques of this disclosure are relatively simple to implement, particularly when compared to conventional head related transfer functions (HRTFs), which have been developed to create perceptual changes in audio signals. The techniques described herein may be implemented in hardware, software, firmware, or any combination thereof. If implemented in software, this disclosure may be directed to a computer readable medium comprising instructions, that when executed in an audio device causes the device to perform one or more of the audio mixing techniques described herein. In that case, the computer readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, and the like.

The instructions may be computer-readable instructions, and a digital signal processor (DSP) may execute instructions stored in memory in order to carry out one or more of the audio mixing techniques. In some cases, the techniques may be executed by a DSP that invokes various hardware components to accelerate the mixing process. In other cases, the units or modules described herein may be implemented as a microprocessor, one or more application specific integrated circuits (ASICs), one or more field programmable gate arrays (FPGAs), discrete logic circuitry, or some other hardware-software combination.

In the foregoing discussion, this disclosure has provided details in the context of mixing a stereophonic music signal with a monophonic phone call. The techniques could easily work with monophonic music, however, in which case the different channels would be duplicates of the monophonic signal. The techniques could also work with a stereophonic phone calls. Moreover, the techniques of this disclosure may be used to mix any two audio signals, where one signal is moved to a background relative to the other signal in the foreground. In other words, the discussion of music and phone calls is only one example of two different audio signals that can be mixed using the techniques of this disclosure. These and other embodiments are within the scope of the following claims.

The invention claimed is:

1. A method comprising:
receiving a first audio and a second audio;
applying a first positive gain to a first channel of the first audio;
applying a negative gain to a second channel of the first audio;
applying a second positive gain to a first channel of the second audio;
applying a third positive gain to a second channel of the second audio;
combining the first channel of the first audio with the first channel of the second audio; and
combining the second channel of the first audio with the second channel of the second audio.

2. The method of claim 1, wherein the first audio is music audio and the second audio signal is phone call audio associated with an incoming telephone call.

3. The method of claim 1, further comprising applying scalar functions to the first audio to change between foreground and background output for the first audio, wherein the scalar functions include:
a first front scalar function for the first channel of the first audio;
a second front scalar function for the second channel of the first audio;
a first back scalar function for the first channel of the first audio; and
a second back scalar function for the second channel of the first audio,
wherein the gains to the first audio are applied in a path that defines the background output.

4. The method of claim 3, wherein the scalar functions cause a perceptual change in the first audio from a front perceptual location to a back perceptual location in response to a change from a music mode to a phone call mode.

5. The method of claim 4, wherein in response to the change from the music mode to the phone call mode:
the first front scalar function for the first channel of the first audio changes foreground output for the first channel of the first audio from unity to zero;
the second front scalar function for the second channel of the first audio changes foreground output for the second channel of the first audio from unity to zero over a different time period than the front scalar function for the first channel of the first audio;
the first back scalar function for the first channel of the first audio changes background output for the first channel of the first audio from zero to unity;
the second back scalar function for the second channel of the first audio changes background output for the second channel of the first audio from zero to unity over a different time period than the back scalar function for the first channel of the first audio.

6. The method of claim 1, wherein the negative gain comprises a first negative gain, the method further comprising:

applying a second negative gain to a second path of the second channel of the first audio and adding the second path into the first channel of the first audio.

7. The method of claim 6, wherein:
the first positive gain to the first channel of the first audio is approximately 0.5;
the first negative gain to the second channel of the first audio is approximately −0.12;
the second negative gain to the second path of the second channel of the first audio is approximately −0.07;
the second positive gain to the first channel of the second audio is approximately 0.575; and
the third positive gain to the second channel of the second audio is approximately 0.818.

8. The method of claim 1, further comprising applying low pass filters to the first and second channels of the first audio.

9. The method of claim 1, further comprising delaying the second channel of the first audio.

10. The method of claim 1, wherein the first and second channels of the first audio comprise left and right stereo channels and wherein the second audio is a mono audio, the method further comprising defining the left and right channels of the second audio as copies of the mono audio.

11. The method of claim 1, wherein the first audio and the second audio are mono audio, the method further comprising defining the left and right channels respectively for the first and second audio.

12. A method comprising:
receiving a music audio and a phone call audio, the music audio including first and second channels and the phone call audio including a mono channel;
applying scalar functions to the music audio to change a path of the music audio from a foreground path to a background path;
applying low pass filters to the first and second channels of the music audio in the background path;
delaying the second channel of the music audio in the background path;
applying a first positive gain to the first channel of the music audio in the background path;
applying a first negative gain to a first path of the second channel of the music audio in the background path;
applying a second negative gain to a second path of the second channel of the music audio in the background path;
adding the second path of the second channel of the music audio into the first channel of the music audio in the background path;
defining first and second channels for the phone call audio based on mono channel;
applying a second positive gain to a first channel of the phone call audio;
applying a third positive gain to a second channel of the phone call audio;
combining the first channel of the music audio in the background path with the first channel of the phone call audio; and
combining the second channel of the music audio in the background path with the second channel of the phone call audio.

13. The method of claim 12, further comprising applying scalar functions to the music audio to change between the foreground and background paths, wherein the scalar functions cause a perceptual change in the music audio from a front perceptual location to a back perceptual location in response to a change from a music mode to a phone call mode.

14. The method of claim 13, wherein applying scalar functions includes
applying a first front scalar function for the first channel of the music audio to change foreground output for the first channel of the music audio from unity to zero;
applying a second front scalar function for the second channel of the music audio to change foreground output for the second channel of the music audio from unity to zero over a different time period than the front scalar function for the first channel of the music audio;
applying a first back scalar function for the first channel of the music audio to change background output for the first channel of the music audio from zero to unity; and
applying a second back scalar function for the second channel of the music audio to change background output for the second channel of the music audio from zero to unity over a different time period than the back scalar function for the first channel of the music audio.

15. A computer readable medium comprising instructions that upon execution:
receive a first audio and a second audio;
apply a first positive gain to a first channel of the first audio;
apply a negative gain to a second channel of the first audio;
apply a second positive gain to a first channel of the second audio;
apply a third positive gain to a second channel of the second audio;
combine the first channel of the first audio with the first channel of the second audio; and
combine the second channel of the first audio with the second channel of the second audio.

16. The computer readable medium of claim 15, wherein the first audio is music audio and the second audio is phone call audio associated with an incoming telephone call.

17. The computer readable medium of claim 15, wherein the instructions apply scalar functions to the first audio to change between foreground and background output for the first audio, wherein the scalar functions include:
a first front scalar function for the first channel of the first audio;
a second front scalar function for the second channel of the first audio;
a first back scalar function for the first channel of the first audio; and
a second back scalar function for the second channel of the first audio,
wherein the gains to the first audio are applied in a path that defines the background output.

18. The computer readable medium of claim 17, wherein the scalar functions cause a perceptual change in the first audio from a front perceptual location to a back perceptual location in response to a change from a music mode to a phone call mode.

19. The computer readable medium of claim 18, wherein in response to the change from the music mode to the phone call mode:
the first front scalar function for the first channel of the first audio changes foreground output for the first channel of the first audio from unity to zero;
the second front scalar function for the second channel of the first audio changes foreground output for the second channel of the first audio from unity to zero over a different time period than the front scalar function for the first channel of the first audio;
the first back scalar function for the first channel of the first audio changes background output for the first channel of the first audio from zero to unity;

the second back scalar function for the second channel of the first audio changes background output for the second channel of the first audio from zero to unity over a different time period than the back scalar function for the first channel of the first audio.

20. The computer readable medium of claim 15, wherein the negative gain comprises a first negative gain, wherein the instructions:
apply a second negative gain to a second path of the second channel of the first audio and add the second path into the first channel of the first audio.

21. The computer readable medium of claim 20, wherein:
the first positive gain to the first channel of the first audio is approximately 0.5;
the first negative gain to the second channel of the first audio is approximately −0.12;
the second negative gain to the second path of the second channel of the first audio is approximately −0.07;
the second positive gain to the first channel of the second audio is approximately 0.575; and
the third positive gain to the second channel of the second audio is approximately 0.818.

22. The computer readable medium of claim 15, wherein the instructions apply low pass filters to the first and second channels of the first audio.

23. The computer readable medium of claim 15, wherein the instructions delay the second channel of the first audio.

24. The computer readable medium of claim 15, wherein the first and second channels of the first audio comprise left and right stereo channels and wherein the second audio is mono audio, and wherein the instructions define the left and right channels of the second audio as copies of the mono audio.

25. The computer readable medium of claim 15, wherein the first audio and the second audio are mono audio, and wherein the instructions define the left and right channels respectively for the first and second audio.

26. A device comprising:
an audio mixing unit that combines two or more audio signals to form an audio output, wherein the audio mixing unit:
receives a first audio signal and a second audio signal;
applies a first positive gain to a first channel of the first audio signal;
applies a negative gain to a second channel of the first audio signal;
applies a second positive gain to a first channel of the second audio signal;
applies a third positive gain to a second channel of the second audio signal;
combines the first channel of the first audio signal with the first channel of the second audio signal; and
combines the second channel of the first audio signal with the second channel of the second audio signal.

27. The device of claim 26, wherein the device comprises a radio telephone, and wherein the first audio signal is music audio and the second audio signal is phone call audio associated with an incoming telephone call, the device further comprising:
a music unit that generates the music audio;
a transmitter/receiver that receives a wireless communication; and
a modem that generates the phone call audio from the wireless communication.

28. The device of claim 26, wherein mixing unit applies scalar functions to the first audio signal to change between foreground and background output for the first audio signal, wherein the scalar functions include:
a first front scalar function for the first channel of the first audio signal;
a second front scalar function for the second channel of the first audio signal;
a first back scalar function for the first channel of the first audio signal; and
a second back scalar function for the second channel of the first audio signal,
wherein the gains to the first audio signal are applied in a path that defines the background output.

29. The device of claim 28, wherein the scalar functions cause a perceptual change in the first audio signal from a front perceptual location to a back perceptual location in response to a change from a music mode to a phone call mode.

30. The device of claim 29, wherein in response to the change from the music mode to the phone call mode:
the first front scalar function for the first channel of the first audio signal changes foreground output for the first channel of the first audio signal from unity to zero;
the second front scalar function for the second channel of the first audio signal changes foreground output for the second channel of the first audio signal from unity to zero over a different time period than the front scalar function for the first channel of the first audio signal;
the first back scalar function for the first channel of the first audio signal changes background output for the first channel of the first audio signal from zero to unity;
the second back scalar function for the second channel of the first audio signal changes background output for the second channel of the first audio signal from zero to unity over a different time period than the back scalar function for the first channel of the first audio signal.

31. The device of claim 26, wherein the negative gain comprises a first negative gain, wherein the mixing unit:
applies a second negative gain to a second path of the second channel of the first audio signal and add the second path into the first channel of the first audio signal.

32. The device of claim 31, wherein:
the first positive gain to the first channel of the first audio signal is approximately 0.5;
the first negative gain to the second channel of the first audio signal is approximately −0.12;
the second negative gain to the second path of the second channel of the first audio signal is approximately −0.07;
the second positive gain to the first channel of the second audio signal is approximately 0.575; and
the third positive gain to the second channel of the second audio signal is approximately 0.818.

33. The device of claim 26, wherein the mixing unit applies low pass filters to the first and second channels of the first audio signal.

34. The device of claim 26, wherein the mixing unit delays the second channel of the first audio signal.

35. The device of claim 26, wherein the first and second channels of the first audio signal comprise left and right channels and wherein the second audio signal is a mono audio signal, and wherein the mixing unit defines the left and right channels of the second audio signal as copies of the mono audio signal.

36. The device of claim 26, wherein the first audio signal and the second audio signal are mono audio signals, and wherein the mixing unit defines the left and right channels respectively for the first and second audio signals.

37. The device of claim 26, further comprising:
speakers; and
a drive circuit that receives combined signals for the first and second channels and generates drive signals to drive the speakers.

38. The device of claim 26, wherein the first and second audio signals comprise one of:
digital signals; and
analog signals.

39. A device comprising:
means for receiving a music audio signal and a phone call audio signal, the music audio signal including first and second channels and the phone call audio signal including a mono channel;
means for applying scalar functions to the music audio signal to change a path of the music audio signal from a foreground path to a background path;
means for applying low pass filters to the first and second channels of the music audio signal in the background path;
means for delaying the second channel of the music audio signal in the background path;
means for applying a first positive gain to the first channel of the music audio signal in the background path;
means for applying a first negative gain to a first path of the second channel of the music audio signal in the background path;
means for applying a second negative gain to a second path of the second channel of the music audio signal in the background path;
means for adding the second path of the second channel of the music audio signal into the first channel of the music audio signal in the background path;
means for defining first and second channels for the phone call audio signal based on mono channel;
means for applying a second positive gain to a first channel of the phone call audio signal;
means for applying a third positive gain to a second channel of the phone call audio signal;
means for combining the first channel of the music audio signal in the background path with the first channel of the phone call audio signal; and
means for combining the second channel of the music audio signal in the background path with the second channel of the phone call audio signal.

40. The device of claim 39, further comprising means for applying scalar functions to the music audio signal to change between the foreground and background paths, wherein the scalar functions cause a perceptual change in the music audio signal from a front perceptual location to a back perceptual location in response to a change from a music mode to a phone call mode.

41. The device of claim 39, wherein means for applying scalar include:
means for applying a first front scalar function for the first channel of the music audio signal to change foreground output for the first channel of the music audio signal from unity to zero;
means for applying a second front scalar function for the second channel of the music audio signal to change foreground output for the second channel of the music audio signal from unity to zero over a different time period than the front scalar function for the first channel of the music audio signal;
means for applying a first back scalar function for the first channel of the music audio signal to change background output for the first channel of the music audio signal from zero to unity; and
means for applying a second back scalar function for the second channel of the music audio signal to change background output for the second channel of the music audio signal from zero to unity over a different time period than the back scalar function for the first channel of the music audio signal.

42. A device comprising an audio mixing unit that:
receives first audio information including first and second stereo channels;
generates first foreground audio output based on the first audio information;
receives second audio information;
applies a second positive gain to a first channel of the second audio information;
applies a third positive gain to a second channel of the second audio information;
applies a first positive gain to the first stereo channel of the first audio information and a negative gain to the second stereo channel of the first audio information to generate background audio output;
generates second foreground audio output based on the second audio information;
applies at least one scalar function to cause a perceptual change over a predetermined period of time in the first audio information from a front perceptual location to a back perceptual location in response to receiving the second audio information; and
combines the second foreground audio output with the background audio output to generate combined output for the first and second audio information.

43. The device of claim 42, wherein the mixing unit uses scaling, filtering, delay, and channel combination to generate the background audio output.

44. A device comprising an audio mixing unit that:
receives music audio;
applies a first positive gain to the a first stereo channel of the music audio audio;
applies a negative gain to a second stereo channel of the music audio;
presents the music audio to a user;
receives telephone call audio;
applies a second positive gain to a first channel of the telephone call audio;
applies a third positive gain to a second channel of the telephone call audio;
mixes the music audio and the telephone call audio so that the first and second channels of the music audio are background audio and the first and second channels of the telephone call audio are foreground audio, including applying the gains to the music audio to create a background perception;
applies at least one scalar function to cause a perceptual change over a predetermined period of time in the music audio from a front perceptual location to a back perceptual location in response to the telephone call audio; and
presents a combination of the music audio with the telephone audio as a combined output with the music in the background and the telephone call in the foreground.

45. The device of claim 44, wherein the mixing unit uses scaling, filtering, delay, and channel combination to generate the background perception for the music audio.

* * * * *